May 31, 1938.  C. MILLER ET AL  2,119,437
MECHANICAL TESTER APPARATUS
Filed Nov. 6, 1936   2 Sheets-Sheet 1
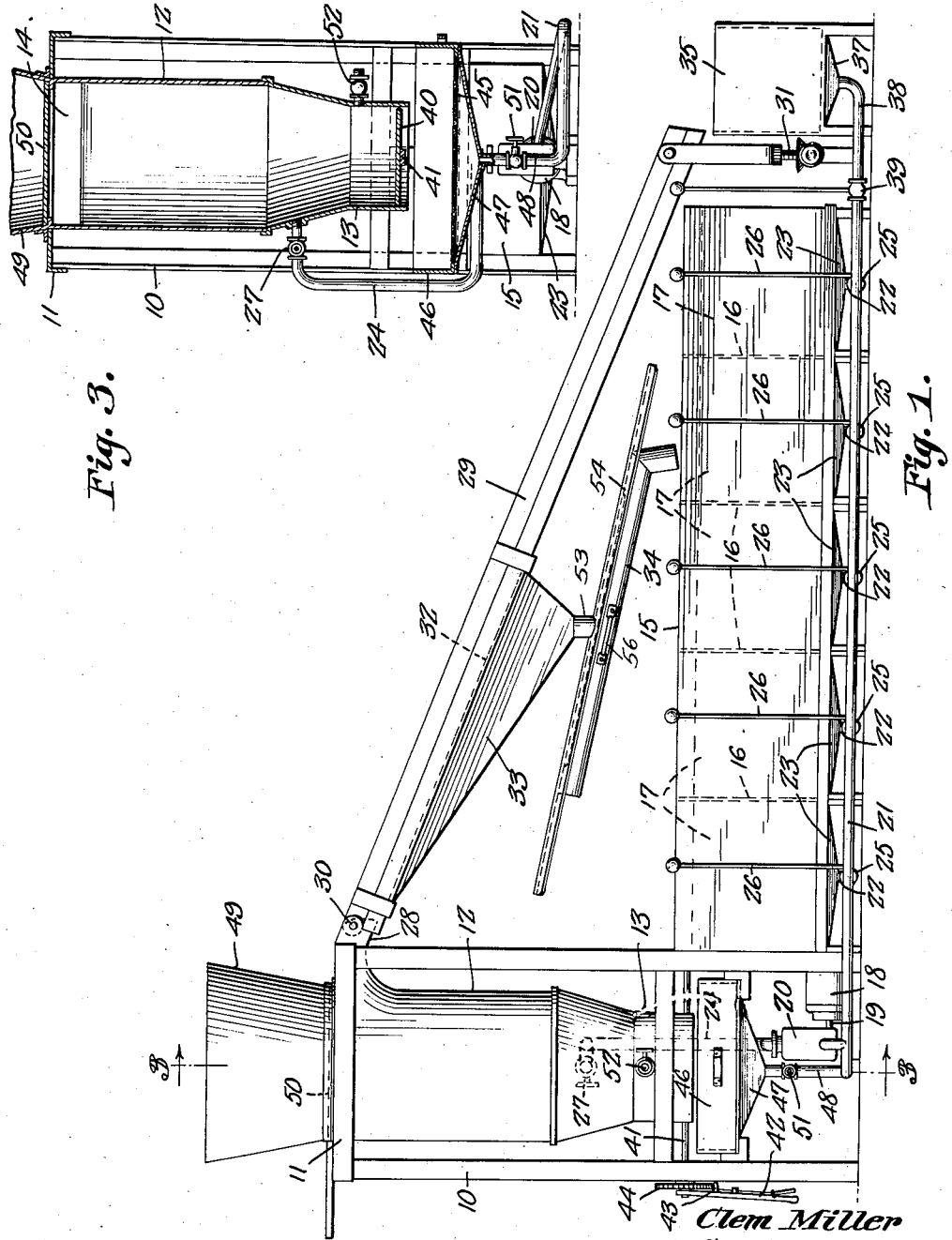
Clem Miller
Gar Boyd
INVENTORS May 31, 1938.  C. MILLER ET AL  2,119,437
MECHANICAL TESTER APPARATUS
Filed Nov. 6, 1936   2 Sheets-Sheet 2
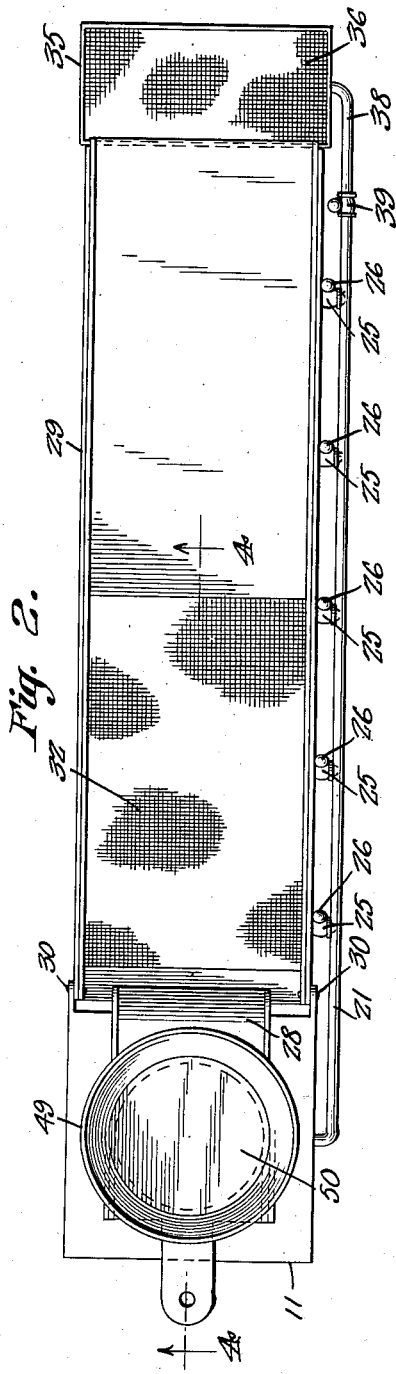
Clem Miller
Gar Boyd
INVENTORS
BY Victor J. Evans & Co.
ATTORNEYS Patented May 31, 1938

2,119,437

UNITED STATES PATENT OFFICE 2,119,437

MECHANICAL TESTER APPARATUS

Clem Miller and Gar Boyd, Nanticoke, Pa.

Application November 6, 1936, Serial No. 109,570

1 Claim. (Cl. 209—173)

The invention relates to a tester and more especially to an apparatus or machine for testing coal.

The primary object of the invention is the provision of a machine or apparatus of this character, wherein acid is utilized for testing purposes and in its use a small quantity is required for the testing operation of the machine or apparatus.

Another object of the invention is the provision of a machine or apparatus of this character, wherein the same mechanically operates so that coal can be separated from refuse in that the coal will be floated and the refuse sunk, the acid for gravity testing being susceptible of continued use in that it is returned to a point of original deposit and thus eliminating waste of the same, the testing operation being carried forth with dispatch.

A further object of the invention is the provision of a machine or apparatus of this character, wherein gravity fluid or liquid having specific gravities is separately stored within the apparatus or machine and may be released for testing purposes with rapidity, the machine or apparatus being of novel construction in its entirety.

A still further object of the invention is the provision of a machine or apparatus of this character, which is comparatively simple in construction, thoroughly reliable and efficient in operation, mechanical in the working thereof, and comparatively inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a side elevation of an apparatus or machine constructed in accordance with the invention.

Figure 2 is a top plan view thereof.

Figure 3 is a sectional view on the line 3—3 of Figure 1 looking in the direction of the arrows.

Figure 4 is a fragmentary sectional view on the line 4—4 of Figure 2 looking in the direction of the arrows.

Figure 5 is a vertical transverse sectional view through the depository for the tested material or coal.

Similar reference characters indicate corresponding parts throughout the several views in the drawings.

Referring to the drawings in detail, the apparatus or machine comprises a vertically disposed stand 10 having suspended from its top 11 therein a cylindrical receiving tank 12 formed with a contracted lower end 13, the upper open end 14 being adapted for introducing the material to be tested as to the specific gravity thereof.

At one side of the stand 10 is arranged a trough 15 having interiorly thereof transverse partitions 16 spaced from each other and disposed perpendicularly dividing said trough into a series of compartments 17, these adapted to contain an acid mix. The mix in the respective compartments are of varying specific gravity characteristics.

Within the stand 10 preferably at its base is arranged an electric motor 18, its power shaft 19 being in driving connection with a pump 20 which at the inlet side thereof has leading thereto a feed pipe or conduit 21 which through connections 22 has communication with the respective compartments 17 through the hopper-like bottoms 23 thereof while at the outlet side of this pump 20 is a delivery pipe 24 communicating directly with the tank 12. The connections 22 each is equipped with a quick setting hand operable cut-off valve 25 controlled by a hand piece 26, the delivery pipe 24 being also equipped with a quick setting hand operable cut-off valve 27. On operating a selected valve 25 and when the pump 20 is active an acid mix of a determined gravity will be forced from its compartment 17 by the pump into the tank for use in testing material which is admitted thereto through the upper open end 14 and under such test according to the gravity characteristic the lighter particles will float and the heavier particles will sink in said tank 12.

The tank 12 at its upper open end is formed with a laterally extending sloping discharge spout 28 adapted for communication with a vertically swinging discharge chute 29 pivoted for vertical swinging as at 30. This chute can be set at the required incline with relation to the spout 28 through the use of a vertically adjustable jack 31 associated with the outer end portion of said chute. The chute next to the spout 28 has formed in its bottom a screen 32 overhanging a return funnel 33 which has associated therewith an adjustable spigot or faucet 34 capable under adjustment thereof for communication with any one or more of the compartments 17 so that acid mix from the tank 12 flowing with the material tested will flow through the screen 32 into the funnel 33 and thence through the faucet or spigot back into the trough 15 to the proper compartment 17 therefor while the material tested on admission to the trough 29 will gravitate therein and be deposited into a receptacle 35 having a screen 36 in its open top, the material being deposited on the screen 36 for inspection if desired. Now should the acid mix reach the receptacle 35 it will pass through the screen and onto the bottom 37 of this receptacle 35 whence through a drain pipe 38 be returned to the feed pipe 21, the drain pipe being connected with this pipe 21. At the point of connection of the drain pipe 38 with the pipe 21 is a quick acting hand set valve 39 to shut or close communication between these pipes when desired.

The contracted lower end 13 of the tank 12 has therein a dumping bottom 40 turned by a stem 41 to which is fixed a throw lever 42 carrying a hand released spring acting latch 43 engageable with a keeper rack 44. The particles sunk during gravity testing of material will drop upon the bottom 40 and this sunk material is waste or slate when testing coal and on the dumping will fall upon a screen 45 in a dump drawer or tray 46 which is slidably fitted in the stand 10 beneath the lower end 13 of said tank 12. The screen 45 constitutes the bottom for the said drawer or tray 46 and when the drawer or tray is in normal position beneath the end 13 of the tank 12 its screen 45 is disposed over a catch trap 47 having a drain let-off pipe 48 connected with the pipe 21 so that acid mix carried with the refuse into the drawer or tray 46 will be trapped and returned to the pipe 21.

Suitably supported at the top of the stand 10 for communication with the upper open end 14 of the tank 12 is a supply hopper 49 which has a bottom gate 50 manually operated for opening and closing said hopper and this gate when open establishes communication between the hopper and said tank. The hopper 49 is adaptable for larger material to be tested while the smaller material is admitted directly to the tank 12 through the upper open end 14 thereof and in this instance the hopper 49 is not used being removably fitted with the said stand.

In the operation of the apparatus or machine the coal to be tested by acid mix of a determined gravity character is admitted into the tank 12, for example, of a determined weight, the tank being preferably of a capacity of approximately one hundred pounds. The valve 25 selected to be open for the delivery of an acid mix within one of the compartments 17 in the trough 15 is actuated to allow the flow of this acid mix under the action of the pump 20 into the tank 12 and such action is had by the starting of the motor 18 which drives the pump 20, the acid being preferably zinc chloride. Now the acid mix within the tank 12 enables the testing of the coal as to gravity characteristic and thus the sink and float of various veins of coal and its refuse will be had. The floated material will pass into the chute 29 and by gravitation be deposited in the receptacle 35. As stated, should the acid mix flow with the coal into the chute 29, this mix will be caught in the funnel and be returned to the trough 15. Any acid mix entering the receptacle 35 will be returned to the pipe 21. The sunken material, dropped onto the bottom 40 on the turning of the latter at the contracted end 13 of the tank 12 will be delivered into the drawer or tray 46. Should acid mix fall into this tray or drawer, the same will be trapped and returned to the pipe 21. The acid mix in the tank 12 floats the coal out into the chute 29 such coal being delivered by the spout 28 into the said trough.

The refuse in the drawer or tray 46 can be inspected if required in that such drawer or tray can be pulled outwardly from the stand 10 for this purpose.

The apparatus or machine enables gravity testing of material through the use of an acid mix and to test fifty pounds of coal by an acid mix of one hundred and seventy gravity requires only one hundred and twenty-five pounds of acid to the mix for the one hundred and seventy gravity test. The apparatus or machine works mechanically for the floating of the coal and the sinking of the refuse, there being no loss of acid mix during the operation of the machine or apparatus and such mix may be used any number of times, there being provision made to have acid mix of varying specific gravity character held in the apparatus or machine for the use of this mix in testing coal or the like. The testing of the material may be carried forth expeditiously and in the shortest possible period of time.

The drain 48 is equipped with a quick acting hand operated cut-off valve 51 which is opened only when it is desired to return acid mix from the trap 47 to the pipe 21, this valve being closed when the pump 20 is operating to feed the acid mix into the tank 12. The valve 39 in the drain pipe 38 is also closed when the pump 20 is in operation. This valve 51 is arranged exteriorly with respect to the inlet pipe at the inlet side of the pump 20 and thus the feeding of the acid mix to the tank 12 is not interfered with during the working of the said pump.

The contracted end 13 of the tank 12 has fitted therein a valved drain-off cock 52 to which is adapted to be connected a hose so that the acid mix within the tank 12 can be drawn off and returned to any one of the compartments 17 selected in the trough 15.

The spigot or faucet 34 has formed therein at its top a longitudinally directed elongated slot 52' for accommodating the nipple 53 of the funnel 33 which carries a cover piece 54 for the slot 52'. The nipple 53 has fitted thereon a coupling collar 55 holding the nipple slidably joined with the spigot or faucet so that the latter can be manually shifted for its communication with any one or more of the compartments 17. Exteriorly of the spigot or faucet preferably medially thereof is a hand grip 56 so that it can be manually shifted or moved at the will of an operator. The cover piece 54 engages with the top of the spigot or faucet 34 and closes the slot 52' in which travels the nipple 53 as will be clearly apparent from Figure 4 of the drawings.

What is claimed is:

In a machine of the character described having an acid mix trough provided with a bank of compartments for containing varying specific gravity acid mix, a vertically swinging inclined chute superposed relative to said trough and coextensive with the length of the latter, a funnel formed with said chute and arranged remote from the lowermost portion of said chute, means connected with said chute for varying the inclination thereof, a tubular nipple depending from the funnel at the lowermost point thereof, a faucet having a straight major portion provided with an elongated slot receiving said nipple, a coupling collar fitting said nipple and holding the straight portions of the faucet connected with each other for displacement of the said faucet for discharge therefrom in selected compartments in the trough, a separating tank having communication with the uppermost end of said chute, means for supplying liquid to the separating tank for the passage of said liquid onto the inclined chute, and a cover piece fitted with the nipple and covering the slot in the said faucet.

CLEM MILLER.
GAR BOYD.